No. 733,178. PATENTED JULY 7, 1903.
E. M. FISHELL & M. H. MOFFETT.
DRY BATTERY.
APPLICATION FILED APR. 14, 1902.
NO MODEL.
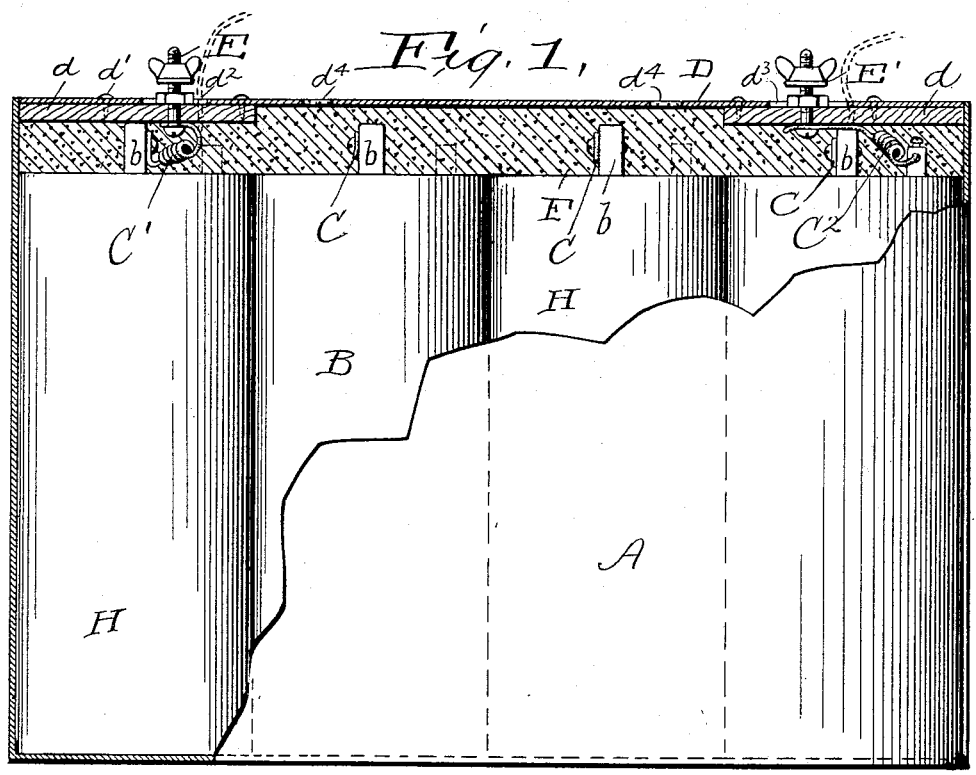
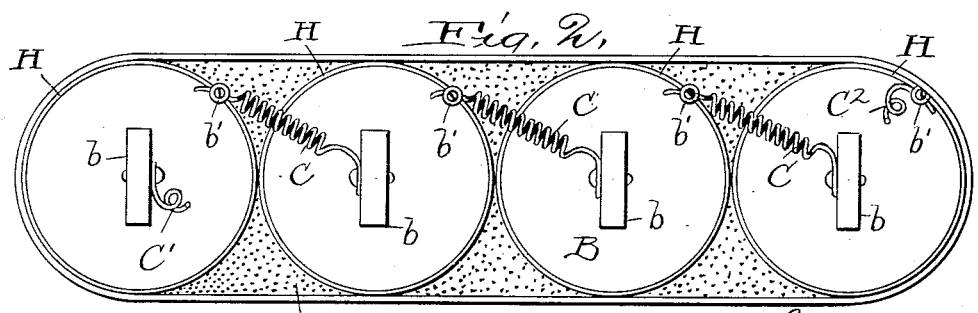
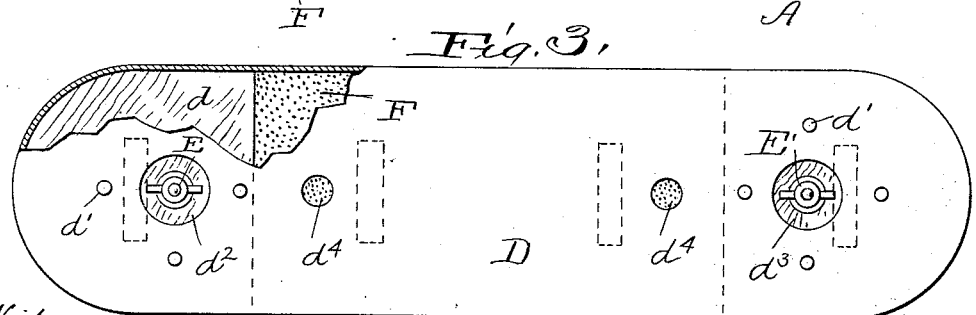
Witnesses
E. B. Gilchrist
H. M. Wise
Inventors
Eugene M. Fishell
Marcus H. Moffett
By Thurston & Bates, attys No. 733,178.

Patented July 7, 1903.

UNITED STATES PATENT OFFICE.

EUGENE M. FISHELL AND MARCUS H. MOFFETT, OF CLEVELAND, OHIO, ASSIGNORS TO NATIONAL CARBON COMPANY, OF CLEVELAND, OHIO, A CORPORATION OF NEW JERSEY.

DRY BATTERY.

SPECIFICATION forming part of Letters Patent No. 733,178, dated July 7, 1903.

Application filed April 14, 1902. Serial No. 102,707. (No model.)

*To all whom it may concern:*

Be it known that we, EUGENE M. FISHELL and MARCUS H. MOFFETT, citizens of the United States, residing at Cleveland, in the county of Cuyahoga and State of Ohio, have invented a certain new and useful Improvement in Dry Batteries, of which the following is a full, clear, and exact description, reference being had to the accompanying drawings.

In practice it is often desirable to use batteries of several cells, and for the sake of convenience it is expedient to arrange these cells so that they constitute, as it were, a single unit. Batteries of this kind are especially useful on automobiles and launches. In both instances they are subjected to considerable jarring, which if the cells are allowed a relative movement has a tendency to disturb the connections of wiring between them. On launches in addition to this the cells are apt to become wet, with the consequent bad effects.

The object of this invention is to provide a dry battery composed of a plurality of cells compactly and immovably inclosed in a case of convenient form impervious to moisture, and especially prepared for rough handling or hard usage.

The invention consists in a certain arrangement and combination of parts to be more fully described hereinafter and definitely set forth in the claims.

In the drawings, which fully illustrate our invention, Figure 1 represents a side elevation of our invention, the outer case being broken away, as indicated, and the upper portion of said case being shown in section. Fig. 2 represents the same with the cover removed, showing a plurality of cells within the case. Fig. 3 represents a plan with the cover in place, but broken away at one end, as indicated.

Referring to the parts by letters, A represents a case, preferably made of tin, with semicircular ends and flat sides, as shown. The cells B used in connection with such a case are of usual form, as indicated, being cylindrical, and the case is made of such a width that it will receive nicely one of these cells, its length being so proportioned that it will receive several of the cells side by side, as indicated in Fig. 2, the cylindrical sides of the cells at the ends fitting nicely against the inner side of the cylindrical wall at the extremities of the case. The cells, as shown, are of a well-known form of dry-battery cells, having an outer cup made of zinc, which serves both as the containing vessel and as the negative electrode. A binding-post $b'$ is secured to this cup, and the positive carbon electrode is also provided with a binding-post $d$. As is usual with such dry-battery cells, the upper end of the zinc cup is closed by a seal of pitch, wax, or some other analogous material. Several of these cells (as many as it will hold) are placed in the case A, said cells having first been put into a jacket H, of strawboard or other material, by which they are insulated from each other and from the case. The space between these cells and the case is then packed with sawdust, wax, or other suitable material, which will assist in preventing them from moving within said case.

A suitable cover D is provided and secured to the open top of the case. Preferably there are attached to the ends of this cover flat pieces or plates $d\,d$, preferably of wood or similar material which is a non-conductor of electricity under ordinary conditions, and these pieces may be shaped with the cover, so that they will pass with it into the mouth of the case and conform to the shape of the same. These plates $d$ rest upon the electrodes, and the cover is soldered to the case, as indicated. Binding-posts E E' or other suitable conductors pass through the cover and are attached, respectively, by means of the conductors C C with the positive and negative terminal electrodes of the battery. When metal binding-posts are employed, they pass through and are attached to the wood plates; but the specific binding-posts may be omitted, and the conductors C C may be insulated and extended any desired distance through the cover, as indicated by dotted lines in Fig. 1. When the battery is to be used in a place where its cover is liable to become wet, this is the preferred construction, because were the metal binding-posts used the battery might be short-circuited by the water on the cover.

After the proper connections have been made, as described, and the cover is in place the cover is soldered to the case. Then the upper part of the case, which, it may be said, has not been filled with the sawdust, is completely filled with pitch, tar, or similar sealing and insulating material F, which is poured into the case, preferably through openings $d^4$, provided in the cover for this purpose. The pitch then hardens, and thus completes the hermetic sealing of the case. In this manner a very compact and convenient battery can be formed, which, while it is as conveniently handled as a single cell, has the combined voltage of the plurality of cells of which it is composed.

The electrodes themselves, together with the sealing material which envelops them, afford means for resisting any tendency of the cells to move, wherefore the connected terminals of different cells are maintained in the proper position in which they were originally placed. The pitch, while it constitutes a packing and a means for preventing a movement of the cells, is also an insulator, and consequently affords no "short-circuit" path between the electrodes.

There may of course be as many cells as desired. For the purpose mentioned the battery is preferably composed of four cells, as shown.

Having described our invention, we claim—

1. In a dry battery, in combination, a metallic case, a plurality of electrically-connected cells carried therein, packing surrounding said cells, a metallic cover sealed to said case and having two holes through it, wooden members secured to said metallic cover on the inner side thereof covering said holes, a sealing material in the space between the cover and cells, and binding-posts serving as terminals for said cells secured to said wooden members and passing through the holes in the cover.

2. In a dry battery, in combination, a case, a plurality of electrically-connected cells carried therein, a metallic cover for said case having two holes near its ends, and one or more intermediate holes, plates of non-conducting material secured to the inner side of said cover, over the end holes therein, sealing and insulating material covering said cells, and terminals mounted in said plates and passing through said end openings, wherefore they are insulated from said cover.

3. In a dry battery, in combination, a case, cylindrical cells carried therein, a packing surrounding said cells within said case, said cells having projecting electrodes, a sealing material enveloping said electrodes, a cover for said case and having one or more holes through which said sealing material is admitted into said case after said cover is sealed thereon, and terminals for said cells projecting through said cover and insulated therefrom.

In testimony whereof we hereunto affix our signatures in the presence of two witnesses.

EUGENE M. FISHELL.
MARCUS H. MOFFETT.

Witnesses:
C. T. RICHMOND,
M. M. ZELLERO.